April 4, 1950
F. H. BRAY ET AL
2,502,415
LINE FINDER ALLOTER CIRCUIT
FOR TELEPHONE EXCHANGES
Filed June 23, 1944
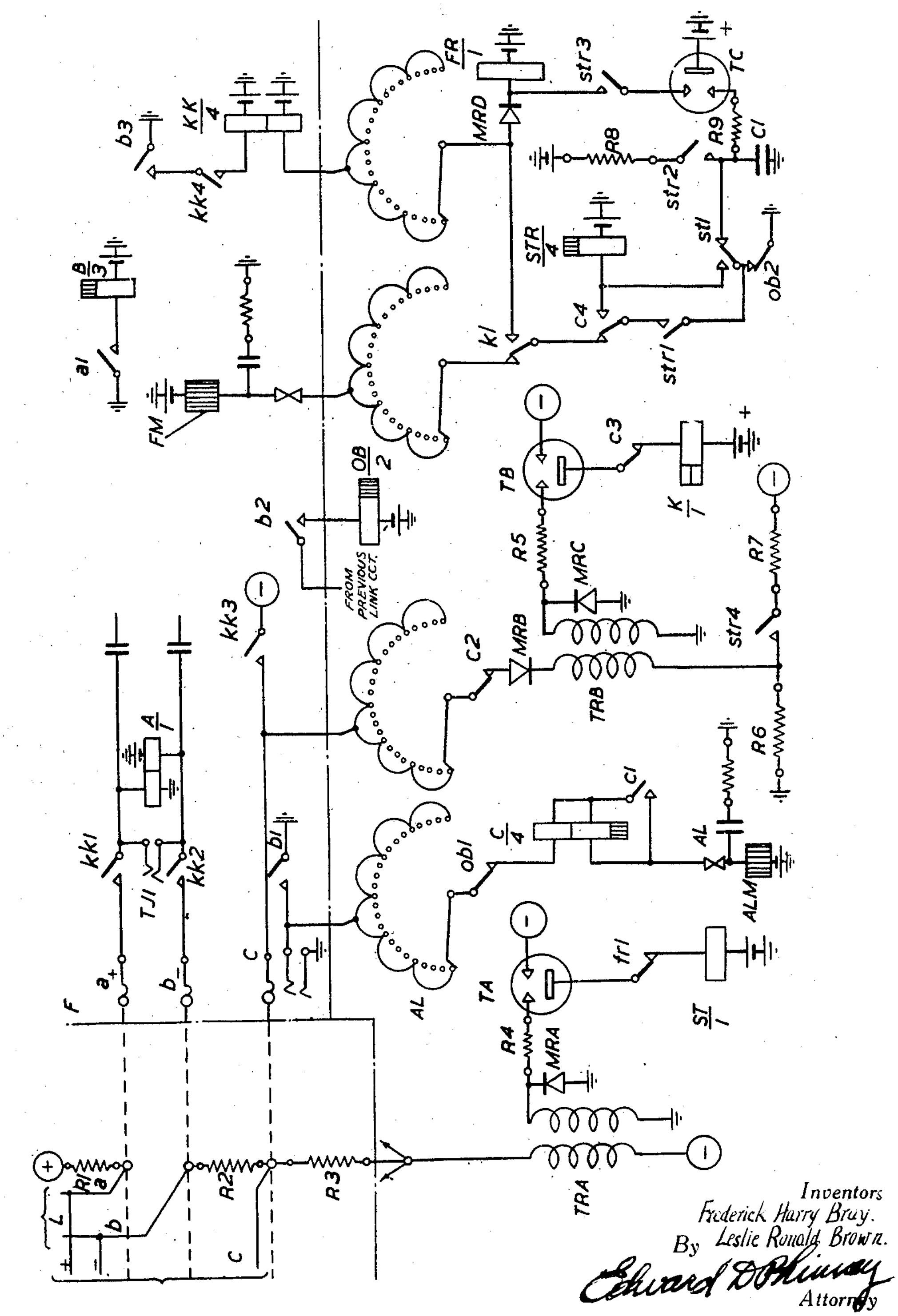
Inventors
Frederick Harry Bray.
Leslie Ronald Brown.
By Edward D. Phinney
Attorney Patented Apr. 4, 1950 2,502,415

UNITED STATES PATENT OFFICE 2,502,415

LINE FINDER ALLOTTER CIRCUIT FOR TELEPHONE EXCHANGES

Frederick Harry Bray and Leslie Ronald Brown, London, England, assignors, by mesne assignments, to International Standard Electric Corporation, New York, N. Y., a corporation of Delaware Application June 23, 1944, Serial No. 541,786
In Great Britain August 31, 1943

15 Claims. (Cl. 179—18)

This invention relates to telecommunication exchange systems.

In British Patent No. 409,670 such a system has been described and claimed comprising a non-contact making relay connected in multiple to a plurality of subscribers' lines or trunks and adapted to change its conditions in response to the initiation of a call on one or more of said lines or trunks to initiate further operations incidental to the setting up of a connection from said calling line or trunk. In the system described by way of example, the non-contact making relay was a thermionic valve, having its grid connected over individual resistances both to the *b* wires of the several lines over the back contacts of individual cut-off relays and over further individual resistances to a source of negative potential. The values of the resistances were so chosen that line leakages would not bring the grid voltage to a value which would allow plate current to pass.

For many applications the life of a thermionic valve is not sufficiently long and the price of such valve is too expensive for the saving realised in line relays by the arrangement described in detail in the above specification.

According to one feature of the present invention we provide a telecommunication exchange system comprising a cold cathode gas-filled discharge tube common to a plurality of lines, means connected in multiple to the said lines whereby the initiation of a call on one or more of said lines causes the application of ionising potential to an electrode of said tube, and means responsive to the ionisation of said tube to initiate further operations incidental to the setting up of a connection from said calling line or trunk.

According to another feature of the present invention we provide a telecommunication exchange system comprising a number of lines each having a first and a second conductor, a resistance per line, each resistance having one end permanently connected to the second conductor of its associated line and its other end connected through a common impedance to one pole of a source of current, a connection between the other pole of said source of current and said first conductor of each line, means responsive to the change of current through said common impedance for impressing an ionising potential on an electrode of a cold cathode gas-filled discharge tube and means responsive to the ionisation of said tube to cause a finder to hunt for a calling condition on a line in said group of lines.

A cold cathode gas-filled tube is less expensive and has a longer life than a thermionic valve and its use leads to a real saving in costs and maintenance.

In the system described in the above mentioned British Patent No. 409,670 only the individual line relays were eliminated, each line being provided with an individual cut-off relay. In U. S. Patent No. 2,295,032 there was described a system in which both individual line and cut-off relays were eliminated, a thermionic valve common to a group of lines being used, as in British Patent No. 409,670, in place of the individual line relays and the individual cut-off relays being replaced either by a second common thermionic valve or by the same thermionic valve as used in place of the line relays, means being provided to alter the circuit connections to allow said thermionic valve to function first as a starting means for a line finder and secondly as a means of stopping the movement of the line finder.

In accordance with the present invention, we provide a telecommunication exchange system comprising means operative on the initiation of a call on a line to cause a finder switch to hunt for the terminals of the calling line, means responsive to the wipers of said finder switch making contact with the terminals of a calling line to cause the application of ionising potential to an electrode of a cold cathode gas discharge tube, and means responsive to the ionisation of said tube for stopping the operation of said finder switch. This cold cathode tube may be in a test circuit common to a plurality of line finders and may be provided, in addition to a common starting tube or means may be provided to alter the circuit connections to allow the same cold cathode tube to operate first as a means of starting a line finder into operation and secondly as a means for stopping the line finder.

A problem which arises in all cases where individual relays are eliminated and replaced by common equipment for initiating the operation of a line finder and stopping it on the terminals of a calling line is to prevent leakage from other lines setting up such a potential on a wire of a non-calling line as shall simulate the potential due to a calling line. In order to deal with this problem U. S. Patent No. 2,295,032 provided a first resistance permanently connected between one wire of each line and a common battery, a second resistance of substantially the same value and a third resistance of higher value connected in series between the other wire of the line and a common starting means for the line finders, the third conductor of each line being connected to the junction point of the second and third resistances.

According to another feature of this invention a telecommunication exchange system comprises a number of subscribers lines, each having a first, second and third conductor, and a first, second and third resistance, a source of current having one pole connected to the first conductor through the first resistance and its other pole to the second conductor through a start circuit common to all the lines and the second and third resistances in series, the third conductor being connected to the junction of said second and third resistances means in said common start circuit responsive to the initiation of a call on any one of said lines to operate a finder switch to hunt for said line, and to connect to the wiper of the finder switch that makes contact with the third conductors of said lines a source of potential and a rectifier that will limit the flow of current to any of the third conductors of non-calling lines when those conductors are at potentials more negative than the effective potential of the source which, as will be shown below, may be regarded as a point on a voltage divider which is at —25 volts, but will permit the flow of current from the third conductor of a calling line when it is at a potential less negative than the effective potential of the source, i. e. such as at its calling potential of about —17 volts.

The nature of the invention will be better understood from the following description of one embodiment thereof taken in conjunction with the accompanying drawing.

Referring to the drawing, one of a plurality of subscribers' line circuits is shown within the dot and dash lines in the top left hand corner of the drawing. The wires *a* and *b* constitute a two-wire subscribers' line L and these two wires, as well as the private wire *c* are multipled to the terminals of final selectors and to terminals of a plurality of line finders, one of which is shown at F. The positive pole of a common 50 volt battery is connected over an individual resistance R1 of 10,000 ohms to the *a* wire of each line whilst the negative pole of the battery is connected over a common start circuit and over individual resistances R3 and R2 to the *b* wire of each line. The *c* wire is connected to the junction of resistances R2 and R3, which are each 10,000 ohms.

The common start circuit comprises the primary of a transformer TRA, over which the negative pole of the battery is connected to each line. The secondary of the transformer TRA is connected in series with a resistance R4 between the ground and the control electrode of a cold cathode gas-filled discharge tube TA, the cathode of which is connected to the negative pole of the 50 volt battery, the positive pole of which is grounded. The anode of tube TA is connected over back contacts *fr1* and a relay ST to positive of the battery.

The line finders are allotted for operation in turn by an allotter switch AL driven by magnet ALM, and the finder F is shown as being the next finder for operation.

When any subscriber makes a call by placing a loop across the *a* and *b* wires of his line in the usual manner, a current flows through the primary of transformer TRA and induces a momentary current in the secondary. The consequential drop of potential across the secondary, added to the 50 volts already present across the control gap of tube TA ionises the control gap; the ionisation is transferred to the main gap and relay ST operates. Relay ST at contacts *st1* causes the operation of relay STR. At contacts *str1* a circuit is closed for the magnet FM of the finder switch over its own interrupter contacts, contact and wiper of the allotter AL, back contacts *k1* and *c4*, front contacts *str1*, back contacts *ob2* to ground. Contacts *str4* complete a potentiometer over resistances R6 and R7 to battery. A point in this potentiometer of a potential of about —25 volts is connected over the primary of a transformer TRB, a rectifier MRB, back contacts *c2*, wiper and contacts of the allotter switch AL to the *c* wiper of the finder F.

A calling subscriber's line is distinguished by a potential of about —17 volts on the *c* wire instead of the normal—50 volts. This —50 volts may, however, be reduced, if the subscriber's line has a low leak resistance, of the order of 10,000 ohms, to about —25 volts, and accordingly, the potential applied from the common test circuit is altered to —25 volts in order that no current shall flow from such leaky lines. The presence of the rectifier MRB ensures that current shall not flow to a *c* wire having a negative potential of greater than 25 volts, such as is present on a non-leaky non-calling line. A potential of —17 volts on a calling line, however, causes a rush of current in the primary of transformer TRB, when the *c* wiper of the finder F finds such a line.

The secondary of transformer TRB is connected across the control gap of a cold cathode gas-filled discharge tube TB in series with resistance R5 and a 50 volt battery, and the potential across the secondary due to the initiation of current in the primary causes the ionisation of tube TB and the operation of relay K. Relay K at contacts *k1*, breaks the circuit of the finder magnet FM to stop the finder switch. Relay K is of a high speed type so that finder F is immediately arrested. Contacts *k1* also operate relay KK, which at contacts *kk1* and *kk2* extends the *a* and *b* wires of the subscribers line to relay A and at contacts *kk3* connects the 50 volts negative to the *c* wire to busy the line to other calls, and to balance the line. Contacts *k1* also operate relay FR, which at contacts *fr1* opens the anode circuit of tube TA which de-ionises. Relay A operates and at contacts *a1* operates a slow releasing relay B, which, at contacts *b3* completes a locking circuit for relay KK over front contacts *kk4*.

At contacts *b1* relay C is operated, and when at contacts *c1* the high resistance winding relay C is short circuited, magnet ALM is operated, in series with the low resistance winding of the relay C, to step the wipers of the allotter switch to hunt for the next free finder. As contacts *b1* in the circuits of busy finders are closed, magnet ALM will step its wipers on from contacts connected to such finders until a free finder is found. Relay C is slow releasing and remains operated during the successive de-energisations of magnet ALM that occur during the stepping. At contacts *c3* the anode circuit of the tube TB is interrupted so that the tube is de-ionised. Relay K releases and releases relay FR.

Should all the finder switches be busy, a chain circuit, closed by front contacts *b2* in each, operates relay OB which at contacts *ob1* opens the circuit of the allotter switch magnet ALM and at contacts *ob2* opens the circuit of relay STR which is otherwise completed by the operation of ST.

When relay FR operates, as described above, relay ST is released and breaks the operating circuit for STR, but this latter relay holds over $c4$ front and $str1$ front until a free finder is found.

When a free finder is found, relay C operates and breaks the circuit of relay STR, but this latter relay is slow to release and during its releasing time, a circuit is completed for the magnet FM of the finder and it hunts for a calling line. This is provided because it is only a momentary rush of current on a loop being formed across a line that ionises tube TA, so that there is no permanent current to keep the start relay operated if there are two concurrent calls. The release time of STR is sufficient to ensure a complete rotation of a finder switch and if there is no second call relay STR releases and the common circuit returns to normal.

If a call is originated but the subscriber clears before a free finder is found, relay ST operates as before and operates relay STR. When contacts $str2$ close, condenser C1 commences to charge over a resistance R8. If contacts $str2$ remain closed for more than 3 minutes, condenser C1 will charge up to such potential as to ionise tube TC and relay FR is operated over front contacts $str3$ and the main gap of tube TC. Relay FR in operating releases relay ST, followed by relay STR, which, on releasing de-ionises tube TC and releases relay FR so that the circuit returns to normal.

It will be noted that the secondaries of transformers TRA and TRB are shunted by rectifiers MRA and MRC respectively. These rectifiers are so poled as to pass current in a direction opposite to that adapted to impress ionising potential across the control gap of the respective tubes.

Due to the presence of these rectifiers it will be impossible for the secondaries of transformers TRA and TRB to oscillate or "ring" for even a few cycles at the natural frequencies of the circuits including them. Their presence, therefore, prevents false operation of the common starting circuit which could otherwise occur under certain conditions. For example, when the calling potential of substantially −17 volts (which has been caused to exist on a C conductor of a line, which has resulted in firing tube TA and has initiated a hunting function cycle on the part of line finder F) has been replaced by a busy potential of −50 volts, the steady state direct current condition, which will have been attained due to the difference in potential between the −17 and −50 volt points in the common starting circuit, would be altered. That steady state current would, therefore, tend to come to a stop or to lessen in magnitude. Any decrease in this current would produce a voltage of negative polarity at the ungrounded end of the secondary. This transient negative voltage itself would not necessarily have a harmful effect on the action of tube TA. However, if the secondary should be free to "ring," the first reversal which ringing would produce in the polarity of the transient voltage might indeed cause false operation. Since the presence of the rectifier provides a low impedance shunt to any such negatively polarized transient voltage, it absorbs the energy therein and no oscillatory swing is possible which would cause a substantial voltage to appear across the rectifier in its high resistance direction.

Although separate cold cathode tubes TA and TB have been described for the common start and common test circuits respectively, it will be understood that the same tube could be used for both purposes, switching means being provided, as in specification No. 2,295,032 for this purpose.

What is claimed is:

1. In a telecommunication exchange system a cold cathode gas-filled discharge tube having electrodes forming a control gap, a plurality of lines connected therewith, circuit means including a source of current feeding said circuit means and connected in multiple to said lines for applying an ionizing potential to an electrode of said tube in accordance with the initiation of a call on said lines, a unidirectional circuit in shunt to said circuit means and connecting said source of current to said electrode so as to oppose the flow of current from said electrode to said source, and a line finder switch operated in response to the ionization of said tube to hunt for a calling line.

2. A telecommunication exchange system as claimed in claim 1, comprising a second cold cathode gas-filled discharge tube having electrodes forming a control gap and connected with said plurality of lines, said finder switch having wipers connected with said circuit means and making contact with the terminals of a calling line for applying an ionizing potential to an electrode of said second tube, and means responsive to the ionization of said second tube for stopping the operation of said finder switch.

3. In a telecommunication exchange system, a cold cathode gas-filled tube, having electrodes forming a control gap, a plurality of lines connected therewith, a line finder switch for hunting for the terminals of the calling line on the initiation of a call on a line, circuit means including a source of current feeding said circuit means for applying an ionizing potential to an electrode of said cold cathode gas-filled discharge tube, a unidirectional circuit in shunt to said circuit means and connecting said source to said electrode so as to oppose the flow of current from said electrode to said source, said line finder having wipers connecting said circuit means with the terminals of the calling line, and means responsive to the ionization of said tube for stopping the operation of said finder switch.

4. A telecommunication exchange system as claimed in claim 3, comprising a test circuit including the wiper of said finder switch and a transformer the primary of which is connected to the wiper and the secondary of which is connected across the control gap of said tube, the unidirectional circuit being in shunt to the secondary.

5. A telecommunication exchange system as claimed in claim 3 comprising a test circuit common to a plurality of line finder switches, including a wiper in each line finder switch, and a transformer, the primary of which is connected to said wiper and the secondary of which is connected across the control gap of said tube, the unidirectional circuit in shunt to said circuit means and connecting said source to said electrode so as to oppose the flow of current from said electrode to said source.

6. A telecommunication exchange system as claimed in claim 1, comprising a plurality of line finders serving said lines, an allotter circuit for allotting said line finders for service one at a time, means operative on a line finder finding a calling line, for allotting another line finder for operation including means for testing all the lines connected thereto for a calling condition.

7. A telecommunication exchange system as claimed in claim 1, comprising a plurality of line finders serving said lines, a common start and test circuit for said line finders, and circuit means operative after the start of a line finder into operation for measuring a predetermined time, said circuit means including means for stopping said line finder and restoring said common circuit to normal if a calling line has not been found within said predetermined time.

8. In a telecommunication exchange system, a number of subscriber's lines each comprising a first, second and third conductor, and a first, second and third resistance, a source of current having one pole connected to the first conductor through the first resistance, and its other pole to the second conductor, a start circuit connecting said other pole and said second conductor, said start circuit being common to all lines and the second and third resistances in series, the third conductor being connected to the junction of said second and third resistances, a source of potential, circuit means in said common start circuit responsive to the initiation of a call on any one of said lines for operating a finder switch to hunt for said line and to connect to the wiper of the finder switch that makes contact with the third conductors of said lines and source of potential, a rectifier connected to the wiper to prevent the flow of current from the third conductors of non-calling lines due to leakage of potential thereto from other lines and to permit the flow of current due to potential on the third conductor of a calling line, circuit means operative after the start of said finder switch for measuring a predetermined time, said circuit means including means for stopping said line finder and restoring said common circuit to normal if a calling line has not been found within said predetermined time, said means for measuring a predetermined time comprising a circuit including a condenser and a high resistance through which the condenser is charged, a cold cathode gas-filled discharge tube across the control gap of which said condenser is connected, and a relay connected to an electrode of said tube to be operated on ionization of said tube.

9. In a telecommunication exchange system, a number of subscribers' lines each comprising a first, second and third conductor, and a first, second and third resistance, a source of current having one pole connected to the first conductor through the first resistance, and its other pole to the second conductor, a start circuit connecting said other pole and said second conductor, said start circuit being common to all the lines and the second and third resistance in series, the third conductor being connected to the junction of said second and third resistances, a source of potential, circuit means in said common start circuit responsive to the initiation of a call on any one of said lines for operating a finder switch to hunt for said line and to connect to the wiper of the finder switch that makes contact with the third conductors of said lines and source of potential, a rectifier connected to the wiper to prevent the flow of current from the third conductors of non-calling lines due to leakage of potential thereto from other lines, and to permit the flow of current due to potential on the third conductor of a calling line, said source of potential and rectifier being common to a plurality of line finders to form a test circuit, a cold cathode gas-filled discharge tube having a control gap in series with said source of potential and rectifier to be ionized on passage of a current, a transformer having a primary connected in series with said rectifier, and a secondary connected across the control gap of said cold cathode gas-filled discharge tube, the secondary of said transformer being shunted by said rectifier, said rectifier being so poled as to pass current in a direction opposite to that adapted to impress ionizing potential across the control gap of said tube.

10. In a telecommunication exchange system, a cold cathode gas-filled discharge tube, a plurality of lines connected therewith, circuit means connected in multiple to said lines for applying an ionizing potential to said tube in accordance with the initiation of a call on said lines and a line finder switch operated in response to the ionization of said tube to hunt for a calling line, a plurality of line finders serving said lines, a common start and test circuit for said line finders, and circuit means operative after the start of a line finder into operation for measuring a predetermined time, said circuit means including means for stopping said line finder and restoring said common circuit to normal if a calling line has not been found within said predetermined time, said means for measuring a predetermined time comprising a circuit including a condenser and a high resistance through which the condenser is charged, a cold cathode gas-filled discharge tube across the control gap of which said condenser is connected, and a relay connected to an electrode of said tube to be operated on ionization of said tube.

11. A telecommunication exchange system, including a plurality of lines each having at least a first, second and third conductor, a plurality of line finders each having a magnet driving means, allotter switch means, a first common circuit means including a gas-filled discharge device having electrodes forming a control gap and adapted to start a line finder by completing an energizing circuit to its magnet driving means in response to a call initiated on any of said lines, a source of potential having two poles of opposite polarity, one of the poles being connected to one of the conductors of each line through a resistor, the other pole being connected to a third conductor of each of said lines through the primary of a transformer which is a part of the common circuit means and through a resistor in series therewith, the third conductor of each of said lines being connected to the second conductor of each of said lines through a resistor, the secondary of the transformer being connected in series with a source of potential and the control gap in the gas-filled discharge device, the secondary being shunted by a rectifier, a second common circuit means which includes a second gas-filled discharge device and is connected with a wiper of the allotter and with a source of potential, the second common circuit means being adapted to stop a line finder when it has found a calling line, third common circuit means adapted to select another line finder which is idle after a line finder which has been started has stopped on a calling line and to cause the said other line finder to hunt through a plurality of its contacts for any calling potential on another of the plurality of lines during substantially any period of time between a time when the first common circuit means starts a line finder and the second common circuit means stops it.

12. A telecommunication system as claimed in claim 11, in which the second common circuit means includes another rectifier element having high resistance in one direction which is adapted to limit any flow of current to the third conductors of non-calling lines when a line finder wiper passes over contacts therein.

13. A telecommunication exchange system as claimed in claim 11, in which the second common circuit means includes another rectifier element having high resistance in one direction which is adapted to limit any flow of current to the third conductors of non-calling lines when a line finder wiper passes over contacts connected therewith, and including fourth common circuit means adapted to stop a line finder, which was started by the first common circuit means when no calling line has been found after a predetermined period of time.

14. A telecommunication exchange system as claimed in claim 11 in which the second common circuit means includes a rectifier element having high resistance in one direction which is adapted to limit any flow of current to the third conductors of non-calling lines when a line finder wiper passes over contacts connected therewith and including fourth common circuit means adapted to stop a line finder, which was started by the first common circuit means, when no calling line has been found after a predetermined period of time and to return the first and second common circuit means to substantially the same condition as before the first common means started a line finder in response to a call.

15. A telecommunication exchange system as claimed in claim 11, in which the second common circuit element includes another rectifier element having high resistance in one direction which is adapted to limit any flow of current to the third conductors of non-calling lines when a line finder wiper passes over contacts connected therewith including fourth common circuit means, the fourth common circuit means including a third gas-filled discharge device, the third common circuit means adapted to stop a line finder, which was started by the first means, when no calling line has been found after a predetermined period of time, the fourth common circuit means also being adapted to return the allotter switch means to the same condition as it was in before the first common circuit means started a line finder in response to a call.

FREDERICK HARRY BRAY.
LESLIE RONALD BROWN.

REFERENCES CITED

The following references are of record in the file of this patent:

UNITED STATES PATENTS

| Number | Name | Date |
|---|---|---|
| 1,849,694 | Saunders | Mar. 15, 1932 |
| 2,028,195 | Dimond | Jan. 21, 1936 |
| 2,195,317 | Martin | Mar. 26, 1940 |
| 2,242,776 | Clark | May 20, 1941 |